Dec. 27, 1938.　　　C. D. CUTTING　　　2,141,264

UNIVERSAL JOINT

Filed May 7, 1936

INVENTOR.
CHARLES D. CUTTING
BY
ATTORNEY.

Patented Dec. 27, 1938

2,141,264

UNITED STATES PATENT OFFICE 2,141,264

UNIVERSAL JOINT

Charles D. Cutting, Detroit, Mich., assignor to Cutting Sales and Engineering Company, Detroit, Mich., a corporation of Michigan Application May 7, 1936, Serial No. 78,387

6 Claims. (Cl. 64—17)

This invention relates to universal joints and has for its object to provide a joint of improved construction which can be manufactured at reduced costs.

A principal object is to provide an improved bearing assembly capable of self alining functions.

A specific object is to provide a self alining bearing with the parts so arranged as to give long life of wear surfaces and with retaining means of such type as to maintain a constant tightness of parts without undue expense in their manufacture.

Another object is to provide alternate constructions as may be most useful with anti-friction or plain bushings and with a choice of slack preventing means.

Another object is to provide an improved Cardan cross together with an improved method of making the cross. As will hereinafter more fully appear this entails a hub member of any suitable, economical construction bored to receive trunnion shafts of special material imminently suited for the purpose. The trunnions therefore do not have to be forged but may be of round stock cut to lengths.

Figure 1:
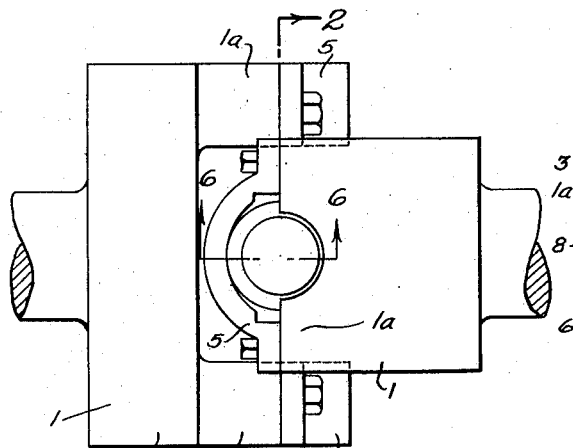
Figure 2:
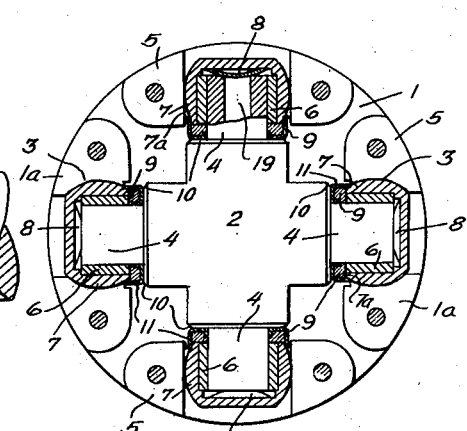
Figure 3:
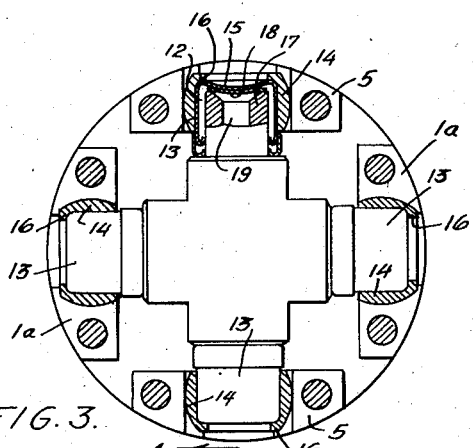
Figure 5:
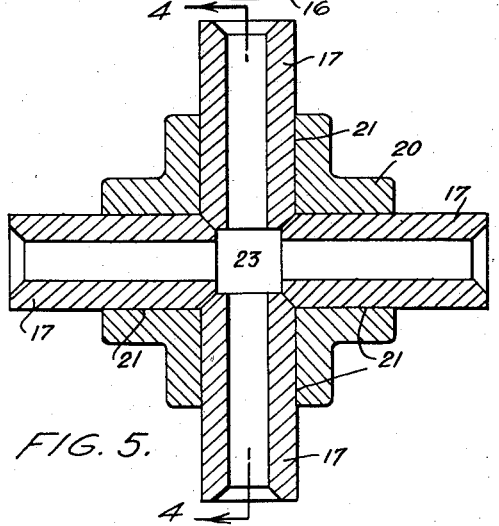
Figure 4:
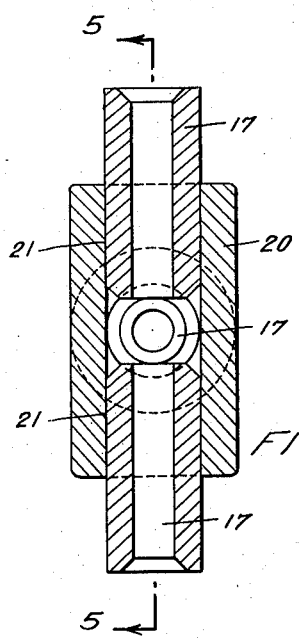
Figure 6:
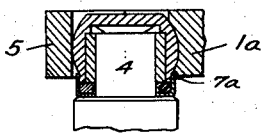

Other objects and advantages will become hereinafter more fully apparent as reference is had to the accompanying drawing wherein my invention is illustrated, by way of example, and in which, Figure 1 is an elevation of my improved joint, Figure 2 is a transverse section taken along the line 2—2 of Figure 1, Figure 3 is a view similar to Figure 2 showing a modification, Figure 4 is a vertical section along the line 4—4 of Figure 5, showing the cross, Figure 5 is a vertical section along the line 5—5 of Figure 4 also showing a section through the cross, and, Figure 6 is a section taken along the line 6—6 of Figure 1 showing a bearing assembly normal to the showing of Figure 2.

One of the preferred forms of my invention comprises a pair of similar main or yoke members 1, which are connected to each other by means of a Cardan cross 2. The Cardan cross 2 has four radiating shafts or trunnions 4 operating in the arms 1a of the yokes 1. The end of each of arms 1a of the yokes is provided with a hemi-spherical recess 3 which receives a bearing for one of the shafts 4 radiating from the Cardan cross 2. Each bearing consists of a bearing metal bushing 6 carried in a cup-like shell 7 having a spherical exterior which fits in the hemispherical recess 3. The bearing shells 7 are retained in the recess 3 by caps 5 bolted to the ends of the yoke arms 1a and having interiors, preferably cylindrical, touching the spherical bearing shells only over a restricted area. This construction insures that the bearings 6 and bearing shells 7 will be positioned laterally only by the recesses 3 and not by the caps 5, so that extreme accuracy in positioning the caps 5 on the ends of the yoke arms 1a to prevent binding will not be necessary. This construction permits pressure by the cap 5 on the bushing without binding and very considerably reduces the cost of construction over accurately fitting the bushings in a spherical recess.

Between the outer end of each trunnion 4 and the bottom of the bushing 7 I interpose a deformed metallic shim 8. The shims in original shape are preferably rectangular in plan view and bent in only one direction. When assembled, as illustrated, these shims are substantially flattened thereby preventing free axial movement of the trunnions with respect to their yokes and acting as slack take-up means.

The mouth of each of the generally spherical, cup-shaped bearing shells 7, which face towards the center of the joint and receive the trunnions 4, is formed into a thin rim 7a whose outer surface is cylindrical and concentric with the trunnion 4. The rim 7a of the bushing 7 fits freely within the rim of an annular cup-shaped dust shield 11 through the bottom of which the trunnion 4 projects. The dust shield 11 fits tightly on the trunnion 4 and contains a packing 9, of cork, rubber, felt or other suitable material, which bears against the inner edge of the rim 7a of the spherical bearing shell 7 and the inner edge of the inner bushing 6 and prevents the escape of oil or the entry of dirt or other foreign matter.

The trunnion bearing assembly of Figure 3 is particularly suitable where needle bearings are desired. These bearings 12 are contained in a cup 13 which fits into a bushing 14 having spherical outer surfaces similar to the bushing 7. The cup 13 is closed at one end 15 and the bushing 14 has a shoulder 16 but need not be closed. The end 15 is depressed, as illustrated, thus positively retaining the needles 12 since the lip 17 of the cup is also closed over the needles. Between the depressed bottom 15 and the end of the contained trunnion 17 is a metallic shim 18 which is originally flat but deformed in assembly to act similarly to the deformed shim 8.

It will be noted that the cross of Figures 2 and 3 each has oil passages 19 axially of its trunnions.

In Figure 3 the outer ends of these passages are bevelled whereas in Figure 2 this is not true. The difference is due to the type of shim used.

The Cardan cross, as best illustrated in Figures 4 and 5 is composed of a center member or hub 20 having bores 21 intersecting each other at right angles at the center thereof. Inserted in each bore from each end thereof are the trunnion members 17. The end of each of these members is bevelled at forty-five degrees to line-contact the bevel of each adjacent member 17. It will be seen that if one of these members 17 has a tight fit with its bore and is pushed thereinto to predetermined distance it will act as an exact positioning means for all other trunnion members. A lubricant reservoir 23 is formed between the ends of the members. In order to assure permanent tight placement of the members 17 in their bores I recommend that the members be subjected to temperature reduction as by subjection to solidified carbon dioxide which causes contraction. This is preferable to heating the center members 20 as the alinement of the bores 21 is not disturbed. Any imperfection in the alinement of the axes of opposite trunnion members is corrected by the use of the spherical bearings 7 and 14 which also are of assistance in maintaining surface contact pursuant to wear of the trunnions.

What I claim is:

1. A trunnion bearing assembly comprising a trunnion having a shoulder, a cylindrical bushing for said trunnion, an oil seal between said bushing and said shoulder, a second bushing having a cylindrical interior into which said first cylindrical bushing fits, said second bushing having a spherical exterior surface, a dust shield secured to the external surface of said spherical bushing and housing said oil seal, and a spherical socket for said spherical exterior surface.

2. A trunnion bearing assembly comprising a trunnion having a shoulder, a cylindrical bushing for said trunnion, an oil seal between said bushing and said shoulder, a second bushing having a cylindrical interior into which said cylindrical bushing fits, said second bushing having a spherical exterior surface terminating at its inner end in a cylindrical portion, a dust shield tightly gripping said cylindrical portion for rotation therewith and enclosing the outside wall of said oil seal and extending between said seal and said shoulder, and a spherical socket for said spherical exterior surface.

3. A trunnion bearing assembly comprising a trunnion, a cylindrical bushing for said trunnion, a cesond bushing having a cylindrical interior into which said cylindrical bushing fits and a spherical exterior wall, said second bushing being of cup shape with the bottom thereof overlying the outer end of said trunnion, and a longitudinally split socket for said second bushing, the interior surface of one part of said socket having a greater radius than the radius of said second bushing.

4. A trunnion bearing assembly for universal joints comprising a trunnion, a cylindrical bushing for the end of said trunnion comprising a metallic cup with cylindrical sidewalls having anti-friction bearings therein with the bottom walls of said cup being turned inwardly to retain the one end of said bearings, and with the bottom of said cup being depressed to retain the other end of said bearings, a second bushing having the bore restricted at one end to receive the first named bushing, said second bushing having a spherical exterior, and a socket having a spherical wall to receive the exterior wall of said second bushing, said socket being longitudinally divided, the interior surface of one part of said socket being substantially the same as that of said second bushing, the interior surface of the other of said parts being of greater radius than said second bushing.

5. A universal joint comprising a cross, bearing assemblies on each of the arms of the cross and concentric with said arms, said bearing assemblies having spherical exteriors, a pair of yokes one at each side of said cross, each of said yokes having arms with hemispherical recesses therein receiving the spherical bearing assemblies on opposite arms of the cross, and caps secured to each arm of each yoke to retain the spherical bearing assemblies in the hemispherical recesses, the surfaces of the caps in contact with the sperical bearing assemblies having less curvature than the spherical surfaces of the bearing assembly.

6. A bearing assembly comprising a shaft bearing portion, a journal bearing in which said bearing portion is mounted for relative rotation, said journal bearing having a spherical exterior surface, and a split socket for said spherical exterior surface, the interior walls of one part of said socket being of substantially the same radius as that of said journal bearing, the interior of the other part of said socket having a greater radius than said journal bearing.

CHARLES D. CUTTING.